US005423073A

United States Patent [19]

Ogawa

[11] Patent Number: 5,423,073

[45] Date of Patent: Jun. 6, 1995

[54] ACOUSTIC SIGNAL TRANSMITTING SYSTEM

[75] Inventor: Yutaka Ogawa, Kanagawa, Japan

[73] Assignee: Fuji Xerox Co., Ltd., Tokyo, Japan

[21] Appl. No.: 948,435

[22] Filed: Sep. 22, 1992

[30] Foreign Application Priority Data

Sep. 30, 1991 [JP] Japan ........ 3-250711

[51] Int. Cl.[6] ........ H04B 1/06

[52] U.S. Cl. ........ 455/70; 381/77; 381/92

[58] Field of Search ........ 455/70, 226; 381/77, 381/92, 94; 179/18 BC; 379/202, 62, 53, 54; 178/5.1

[56] References Cited

U.S. PATENT DOCUMENTS 3,686,823 8/1972 McVoy ........ 178/5.1
4,605,823 8/1986 Sudo et al. ........ 179/18 BC
4,653,102 3/1987 Hansen ........ 381/92
4,709,407 11/1987 Baba ........ 455/226
5,068,889 11/1991 Yamashita ........ 379/62

*Primary Examiner*—Reinhard J. Eisenzopf
*Assistant Examiner*—Mary M. Lin
*Attorney, Agent, or Firm*—Finnegan, Henderson, Farabow, Garrett & Dunner

[57] ABSTRACT

An acoustic signal transmitting system comprises, at a transmission side, a plurality of acoustic input means each for producing an individual acoustic signal; a discriminating signal memory for storing a discriminating signal corresponding to each of the acoustic input means; a modulator for modulating the discriminating signal into a signal with a predetermined acoustic frequency; and a transmission controller for transmitting the acoustic signal when the acoustic input means output the acoustic signal and for transmitting the discriminating signal modulated by the modulator when the acoustic input means do not output the acoustic signal. The system also comprises, at a reception side, a filter for separating the discriminating signal and the acoustic signal from a transmission signal transmitted from the signal transmitting unit through the single channel; a management memory means for storing a table for managing a unique discriminating signal corresponding to each of the acoustic input means and data related to the unique discriminating signal; a reception controller for comparing the discriminating signal separated by the filter with the discriminating signal stored in the management memory to determined whether or not a corresponding acoustic signal exists in the management memory, and for processing the acoustic signal; and means for utilizing the discriminating signal and the corresponding acoustic signal.

5 Claims, 7 Drawing Sheets

| PATTERN LINE OF RECEIVED DISCRIMINATING SIGNAL | STATUS RESULTING FROM TRANSITION |
|---|---|
| 0 0 | SENDING |
| 0 1 | END |
| 1 1 | STB |
| 1 0 | START |

| | PRESENCE OF PREVIOUS DISCRIMINATING SIGNAL | PRESENCE OF PRESENT DISCRIMINATING SIGNAL | STATUS |
|---|---|---|---|
| ID-1 | 0 | 0 | SENDING |
| ID-2 | 0 | 1 | END |
| ID-3 | 1 | 1 | STB |
| ID-4 | 1 | 0 | START |
| ... | ... | ... | ... |
| ... | ... | ... | ... |

ACOUSTIC SIGNAL TRANSMITTING SYSTEM

BACKGROUND OF THE INVENTION

1. Field of the Invention

The present invention relates to an acoustic signal transmitting system capable of discriminating a large number of mutually independent acoustic signals fed from a large number of acoustic input means such as microphones into an acoustic processing means such as a recording apparatus.

2. Prior Art

In general, when mutually independent acoustic signals are input into an acoustic signal processing means such as a recording apparatus through a plurality of acoustic input means such as microphones, it is possible to mix the outputs from the microphones by means of a mixing apparatus and to input the mixed output into an acoustic signal processing means by an input apparatus for a single channel.

However, in the case where it is intended to discriminate the output signals from individual microphones or the like at the side of an acoustic processing means (a utilizing means), it is necessary to provide an input apparatus for a single channel to each of microphones or the like.

In this regard, there are also available processes by which it is made possible to discriminate the independent acoustic signals at the side of an acoustic processing means in such a manner that a plurality of mutually independent acoustic signals are transmitted through a single transmission channel by multiplexing a plurality of input acoustic signals by a frequency multiplex system, which operates with carrier frequencies differentiated for the individual signals in a plurality of acoustic signals, or by a time division multiplex system through digitalization of such signals.

Also, the voice input apparatus disclosed in Japanese Patent Unexamined Publication No. Sho 63-116199 is constructed in such a manner that it is capable of registering the voice patterns of a plurality of specific speakers in advance and discriminating the individual speakers who have pronounced vocal sounds fed into the apparatus. This apparatus receives a specific vocal command from an operator to load the vocal dictionary associated with the operator using voice recognition techniques.

In addition, Japanese Patent Unexamined Publication No. Sho 63-3589 discloses a television conference system, as related technology, which is constructed in such a manner that the system discriminates the speakers on the basis of the output from microphones and automatically directs a television camera towards the particular speaker who has pronounced the vocal sounds. The Television Conference System determines which of a plurality of microphones is generating the highest level of output. This microphone is identified and a look-up table is used to determine which corresponding camera should be activated.

However, the prior art technology described above requires that an acoustic transmitting apparatus should be provided with a mixing apparatus or provided with a multiplex apparatus, so that such an acoustic transmitting apparatus accompanies the problems that the acoustic transmitting apparatus as a whole is necessarily large in its construction and that it is difficult for such an apparatus to be formed in a simple construction and yet to discriminate the individual items of acoustic input means, such as microphones.

Moreover, an acoustic transmitting apparatus which employs a multiplexing system is limited in respect of the number of signals which can be fed into the system, in consequence of the frequency band width and frequency characteristics of the transmitted signals, and such an acoustic transmitting apparatus therefore accompanies the problem that it is difficult for such an acoustic transmitting apparatus to deal properly with signal transmission required in the case where the number of input signals is extremely large.

Further, technology such as that disclosed in Japanese Patent Unexamined Publication No. Sho 63-116199 accompanies the problem that the construction of an apparatus embodying the technology will necessarily be large in its construction because an acoustic processing means having a complicated construction such as a voice recognizing apparatus and so on is indispensable to such an apparatus for discriminating the individual speakers, namely, the input signals fed from the individual microphones.

SUMMARY OF THE INVENTION

The present invention has been attained to solve the above problems, and an object of the invention is to provide an acoustic signal transmitting system which is capable of transmitting a large number of respectively independent acoustic signals by means of an input apparatus for a single channel and also individually discriminating the output signals from individual acoustic input means, such as microphones, by operating a device in a simple construction at the side of an acoustic processing apparatus.

The above object has been achieved by provision of an acoustic signal transmitting system capable of performing signal transmission through a single channel, which comprises, at a signal transmission side, a plurality of acoustic input means each for producing an individual acoustic signal; a discriminating signal memory for storing a discriminating signal corresponding to each of said acoustic input means; modulation means for modulating said discriminating signal into a signal with a predetermined acoustic frequency; transmission control means which transmits said acoustic signal when said acoustic input means output said acoustic signal and transmits said discriminating signal modulated by said modulating means when said acoustic input means do not output said acoustic signal; and, which comprises, at a signal reception side, filter means for separating said discriminating signal and said acoustic signal from a transmission signal transmitted from said signal transmitting unit through said single channel; a management memory means for storing a table for managing a unique discriminating signal corresponding to each of said acoustic input means and data related to said unique discriminating signal; reception control means for comparing said discriminating signal separated by said filter with said discriminating signal stored in said management memory to determined whether or not a corresponding acoustic signal exists in said management memory, and for processing said acoustic signal; and means for discriminating each of said acoustic signal input by said plurality of acoustic input means according to a relationship between said discriminating signal and said acoustic signal.

BRIEF DESCRIPTION OF THE DRAWINGS

The manner by which the above objects and other objects, features and advantages of the present invention are attained will be fully evident from the following detailed description when it is considered in light of the drawings, wherein:

FIG. 9(*a*) is a conceptual drawing illustrating the transition of status due to a received discriminating signal and FIG. 9(*b*) is a chart showing the correspondence between the pattern of a received discriminating signal and its transition status.

DETAILED DESCRIPTION OF THE PREFERRED EMBODIMENTS

Figure 1:
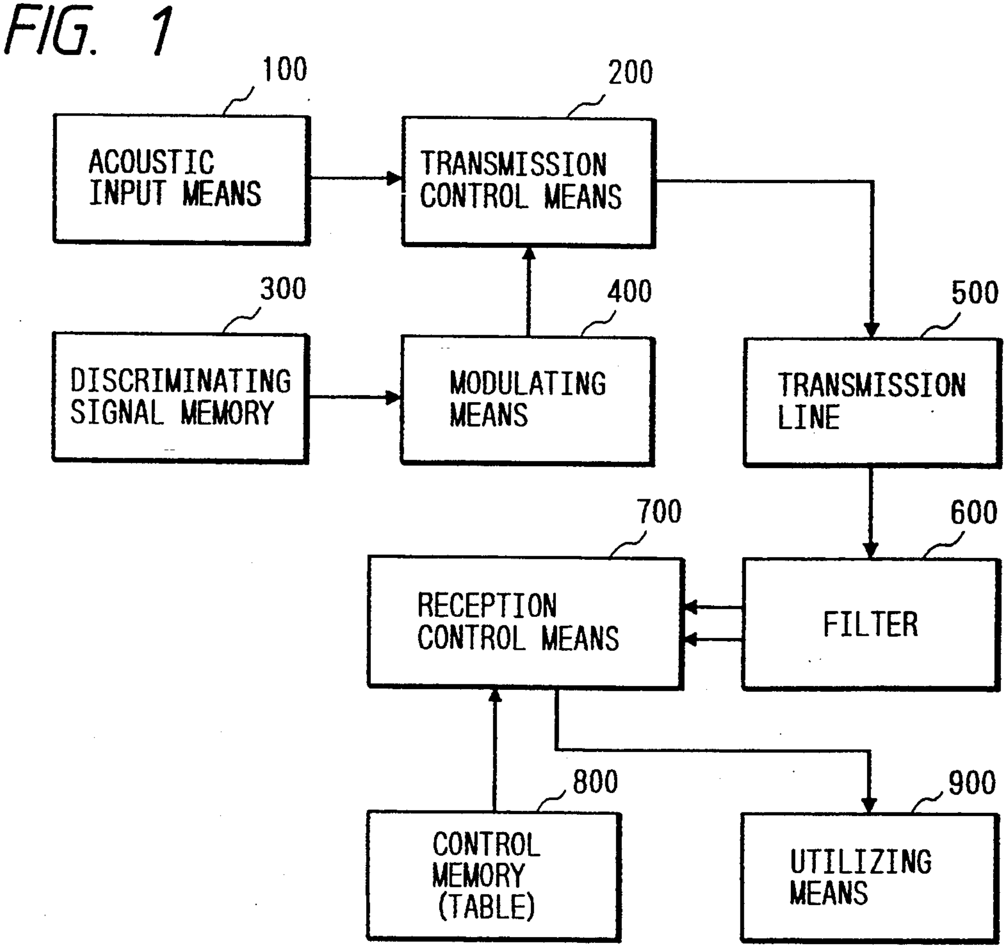
FIG. 1 is a basic construction diagram illustrating a acoustic signal transmitting system according to the present invention.

Now, reference will be made in detail to the construction of a signal transmitting apparatus according to the present invention as illustrated in the accompanying drawings, in which like reference characters designate like or corresponding parts throughout the several drawings.

In the description to follow, some embodiments of the present invention will be used as examples. It should be understood, however, that the present invention is not limited to these examples of embodiments, but may be applied effectively to other forms of its embodiment to such an extent as will not deviate from the technical scope defined for the present invention.

Now, a first embodiment of the present invention will be described in detail with reference to the accompanying drawings.

FIG. 1 is a block diagram illustrating an acoustic signal transmitting system according to the present invention. In the figure, a discriminating signal memory 300 stores discriminating signals respectively corresponding to the individual acoustic input means 100, a modulating means 400 modulates the discriminating signals by predetermined acoustic signal frequencies, a transmission control means 200 controls the transmission of acoustic signals in such a manner as to transmit the acoustic signals when the acoustic signals are put out from any of the acoustic input means, but transmitting the output from the modulating means when the acoustic signal is not being put out. The acoustic input means 100, the transmission control means 200, the discriminating signal memory 300, and the modulating means 400 are provided on the side for the transmission of the acoustic input signals.

The acoustic signal transmission system further includes a filter 600 which separates the discriminating signals and the acoustic signals from the transmitted signals transmitted by way of a transmission line 500 from the transmission side of the acoustic input signals, a control memory 800 which stores a table and related data for the control of a large number of unique discriminating signals respectively corresponding to the individual acoustic input means, a reception control means 700 which determines the presence or absence of corresponding acoustic signals through comparison of the discriminating signals as separated by means of the filter 600 with the discriminating signals stored in the control memory 800 and also processes the acoustic signals, and a utilizing means 900 which utilizes the discriminating signals and the corresponding acoustic signals. The filter 600, the reception control means 700, the control memory 800, and the utilizing means 900 are provided on the signal reception side.

The acoustic input means may include microphones and acoustic reproducing apparatuses, which feed the system with the input of the acoustics from the acoustic sources, and the utilizing means may include such acoustic equipments as a recording apparatus and a voice distributing apparatus.

A acoustic signal transmitted from the acoustic input means 100 is transmitted farther to the signal receiving side by the transmission control means 200 via the transmission line 500.

The discriminating signal memory 300 stores unique discriminating signals respectively corresponding to a large number individual acoustic input means 100 a large number.

The individual discriminating signals which are stored in the discriminating signal memory 300 are modulated by the modulating means 400 into frequency signals in the acoustic signal frequency band and subjected to a conversion of frequency in such a manner that the signals formed by the conversion can be transmitted as signals in the acoustic signal frequency band.

The transmission control means 200 performs the transmission of the discriminating signal as converted by the modulating means 400 at every predetermined interval upon any interruption of the input of the acoustic signal from a predetermined acoustic input means 100, which is taken as the object of the signal transmitting operation.

When the input of a acoustic signal is started again, the transmission of the discriminating signal is brought to an end, and the transmission of the output signals from the individual acoustic input means 100 are executed.

At the signal receiving side, the filter 600 separates the input signals received via the transmission line 500 between the acoustic signals and the discriminating signals, and the acoustic signals are delivered to the utilizing means 900 via the reception control means 700.

The reception control means 700 demodulates the discriminating signal and determines whether or not the discriminating signal as thus demodulated is stored in the control memory 800, and controls the determination whether the particular discriminating signal should be handed over to the utilizing means 900, depending on the presence or absence of a acoustic signal corresponding to the presence or absence of the particular discriminating signal.

Figure 2:
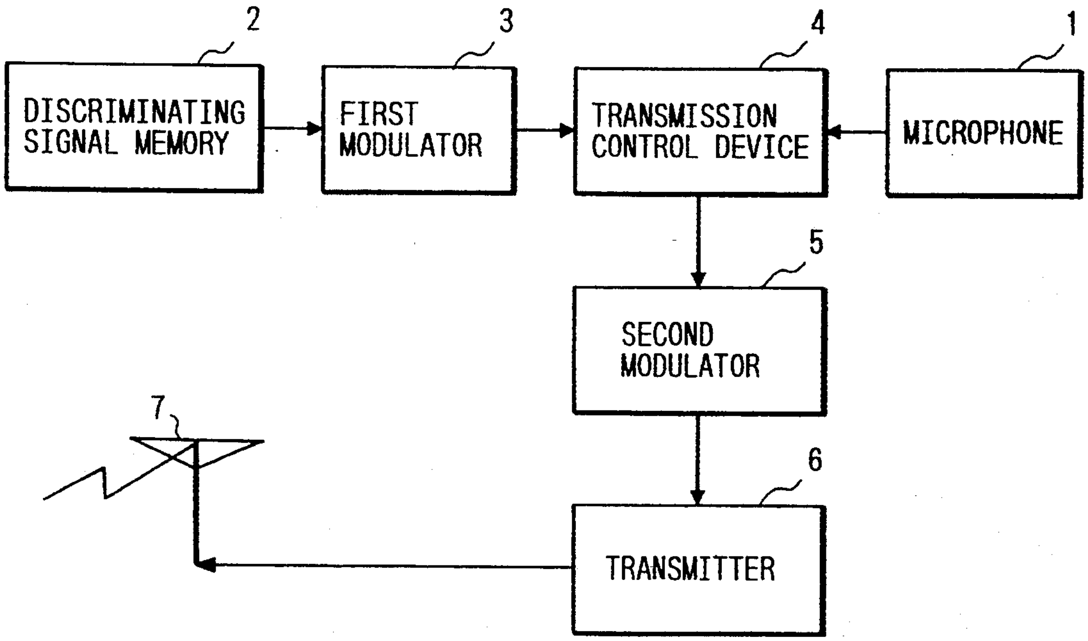
FIG. 2 is a diagram illustrating the construction of a acoustic signal transmitting system cited as an example of preferred embodiment of the present invention.

FIG. 2 is a block diagram illustrating a signal transmitting unit of an acoustic signal transmitting system according to an embodiment of the present invention, by which the outputs from a large number of microphones are transmitted to a signal receiving unit of the device which is a utilizing means, through a space transmission line although only one unit of microphone, which is an acoustic input device, is shown in the drawing.

In FIG. 2, reference numeral 1 denotes a microphone used for the input of acoustic signals; 2, a discriminating signal memory which stores discriminating signals; 3, a first modulator which performs frequency conversion for converting a discriminating signal of encoded data into a signal in an acoustic signal frequency band; 4, a transmission control unit which selectively transmits the output signal from the microphone 1 or the output signal from the first modulator 3; 5, a second modulator which modulates the signal supplied from the transmission control means 4 with a carrier frequency for signal transmission; 6, a transmitter; and 7, a transmitting antenna.

The signal transmitting unit (child equipment) of the signal transmitting system is thus constructed by the microphone 1, the discriminating signal memory 2, the first modulator 3, the transmission control unit 4, the second modulator 5, the transmitter 6, and the transmission antenna 7.

Figure 3:
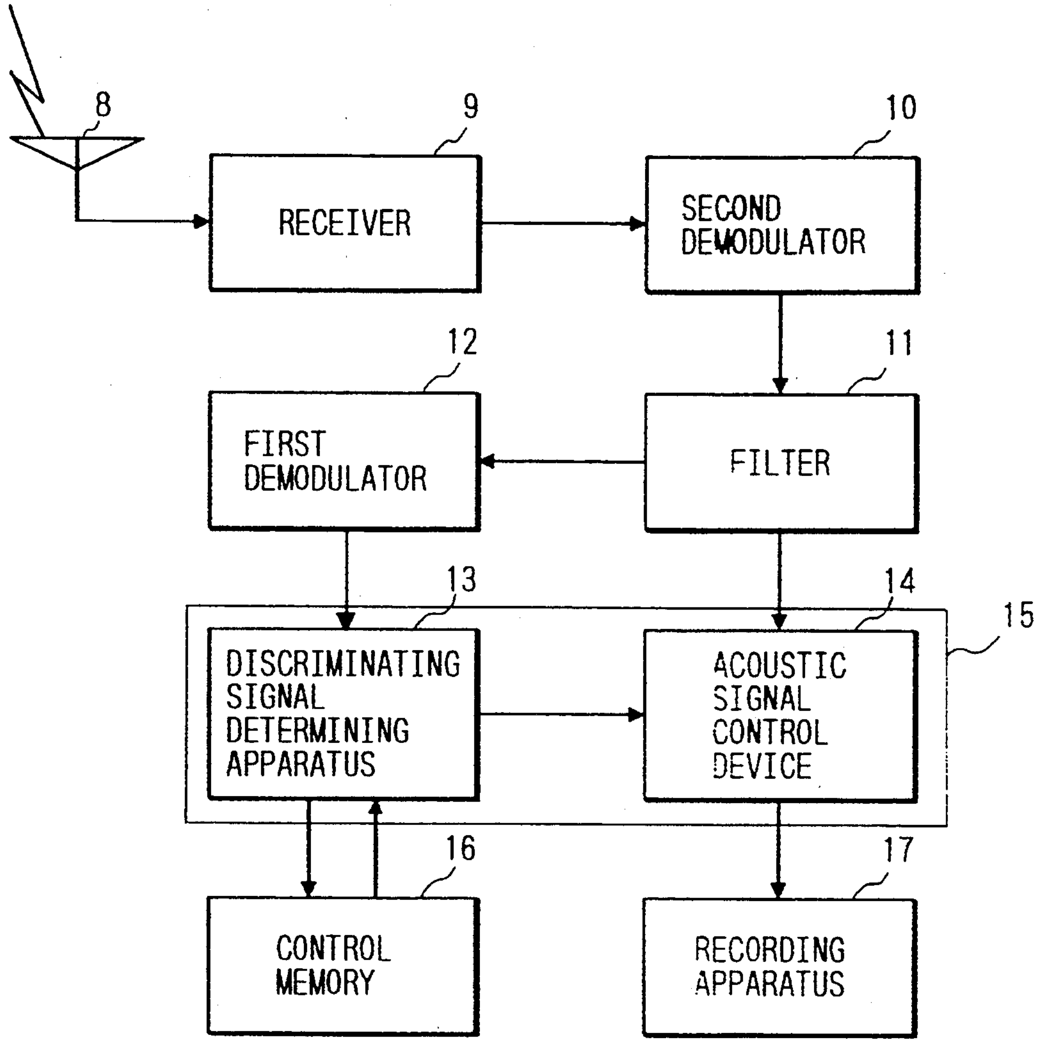
FIG. 3 is a diagram illustrating an example of preferred embodiment of the signal receiving side of the acoustic signal transmitting system according to the present invention.

FIG. 3 is a block diagram illustrating a signal receiving unit of the acoustic signal transmitting system according to the embodiment of the present invention, in which reference numeral 8 denotes a receiving antenna; 9, a receiver; 10, a second demodulator which converts the carrier frequency into the acoustic signal frequency; 11, a filter which separates the acoustic signal and the discriminating signal; 12, a first demodulator which restores the discriminating signal in the acoustic signal frequency band to the original encoded data; 13, a discriminating signal determining apparatus; 14, an acoustic signal control unit which transforms an acoustic signal into a recording format; 15, a reception control unit; 16, a control memory which stores a table for controlling the received discriminating signal and the data related to it; and 17, a recording apparatus used as a utilizing apparatus.

The signal receiving unit (parent equipment) of the acoustic signal transmitting system is thus constructed by the receiving antenna 8, the receiver 9, the second demodulator 10, the filter 11, the first demodulator 12, the discriminating signal determining apparatus 13, the acoustic signal control unit 14, the reception control unit 15, the control memory 16, and the recording apparatus 17.

A description will be made in the case where the acoustic signal transmitting system thus organized is applied to an apparatus for recording the remarks made at a conference.

Figure 4:
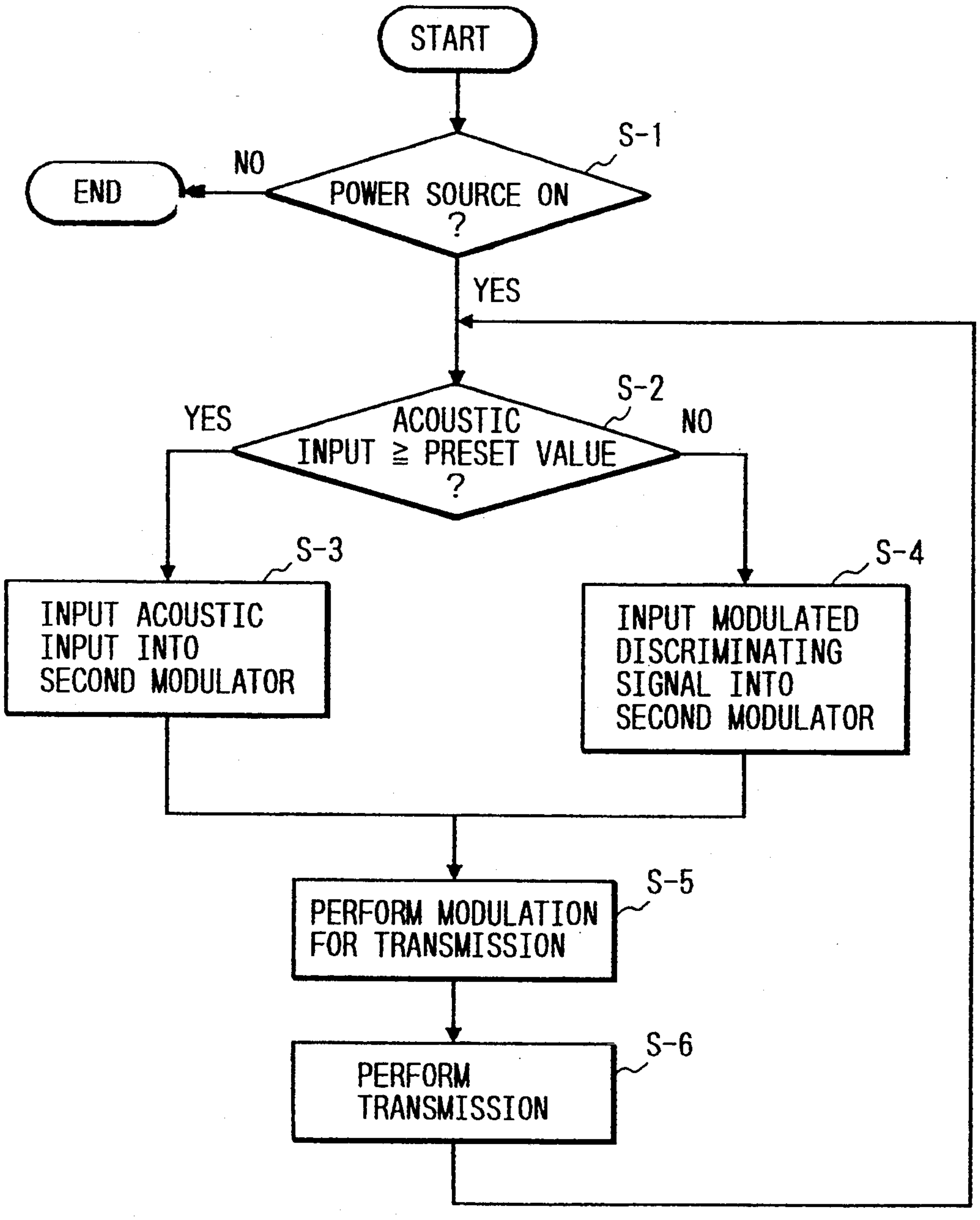
FIG. 4 is a flow chart illustrating the operations to be performed at the signal transmitting side in an example of preferred embodiment of the present invention.

FIG. 4 is a flow chart illustrating the operations of the signal transmitting unit (child equipment) shown in FIG. 2. First at the signal transmitting side, a unique discriminating signal is read out from the discriminating signal memory 2 to the microphone 1 when an electric power is supplied to the microphone 1 (Step S-1).

This discriminating signal is modulated by the first modulator 3 into an acoustic signal frequency which approximates to the audible frequency band, for example, the frequency of 30 kHz, and then input into the transmission control unit 4.

In the case where the level of the acoustic signal input from the microphone 1 is lower than a preset level (namely, a preset value) ("No" at Step S-2), the modulated signal output from the first modulator 3 is modulated further at the signal transmission frequency in the second modulator 5, and the signal thus further modulated is transmitted at the predetermined intervals from the transmitter 6 via the transmitting antenna 7. These transmitting intervals are set with the transmission control unit 4.

On the other hand, in the case where the level of the acoustic singal input from the microphone 1 is larger than the preset level ("Yes" at Step S-2), the discriminating signal will not be transmitted, instead, the input acoustic signal is modulated by the second modulator 5 and transmitted from the transmitter 6 via the transmitting antenna 7.

Figure 5:
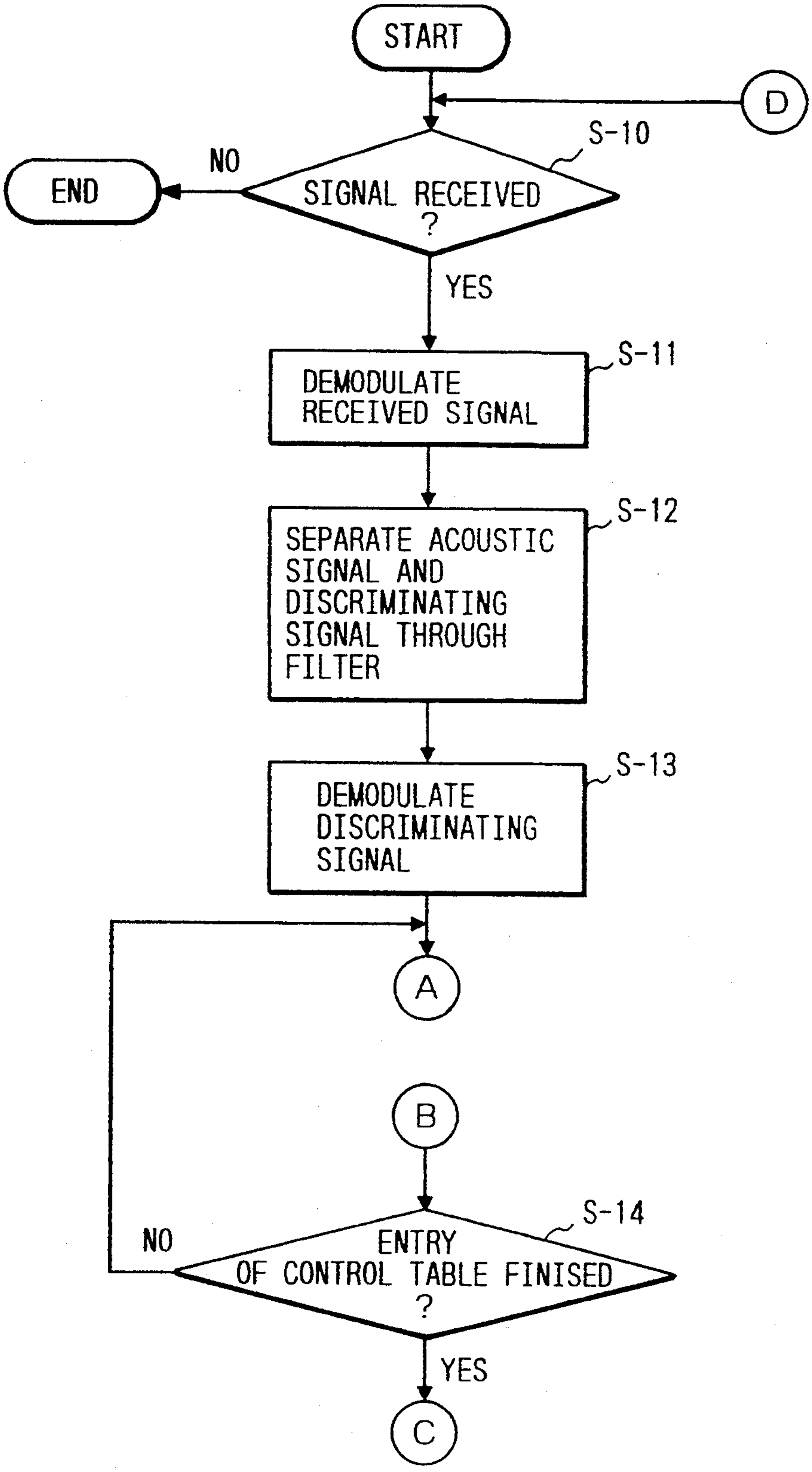
FIG. 5 is a partial flow chart illustrating the operations to be performed at the signal receiving side in an example of preferred embodiment of the present invention.
Figure 6:
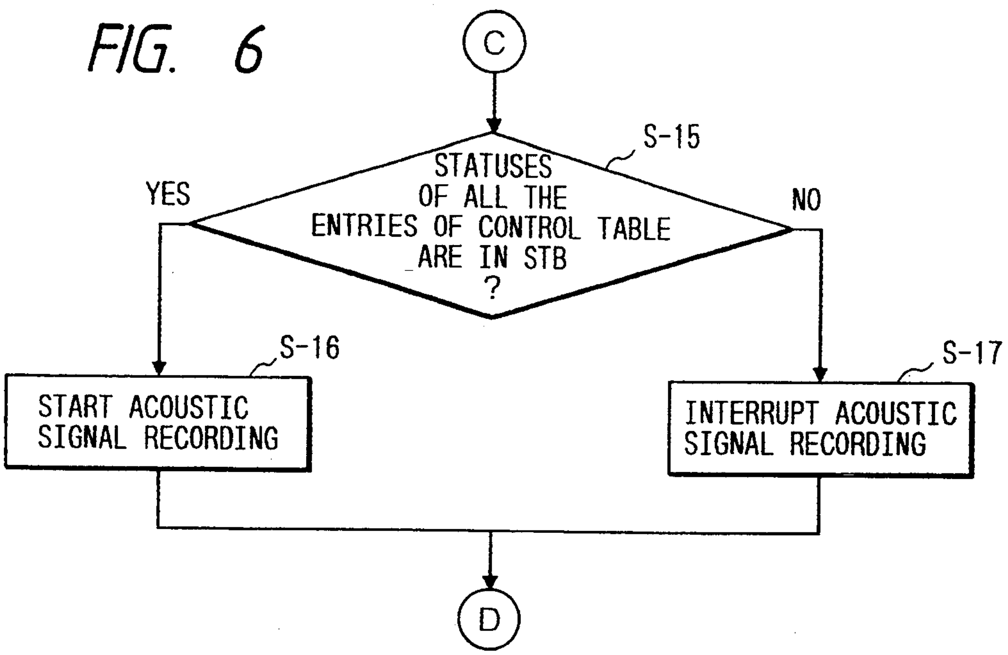
FIG. 6 is a partial flow chart further illustrating the operations to be performed at the signal receiving side in an example of preferred embodiment of the present invention of FIG. 5.
Figure 7:
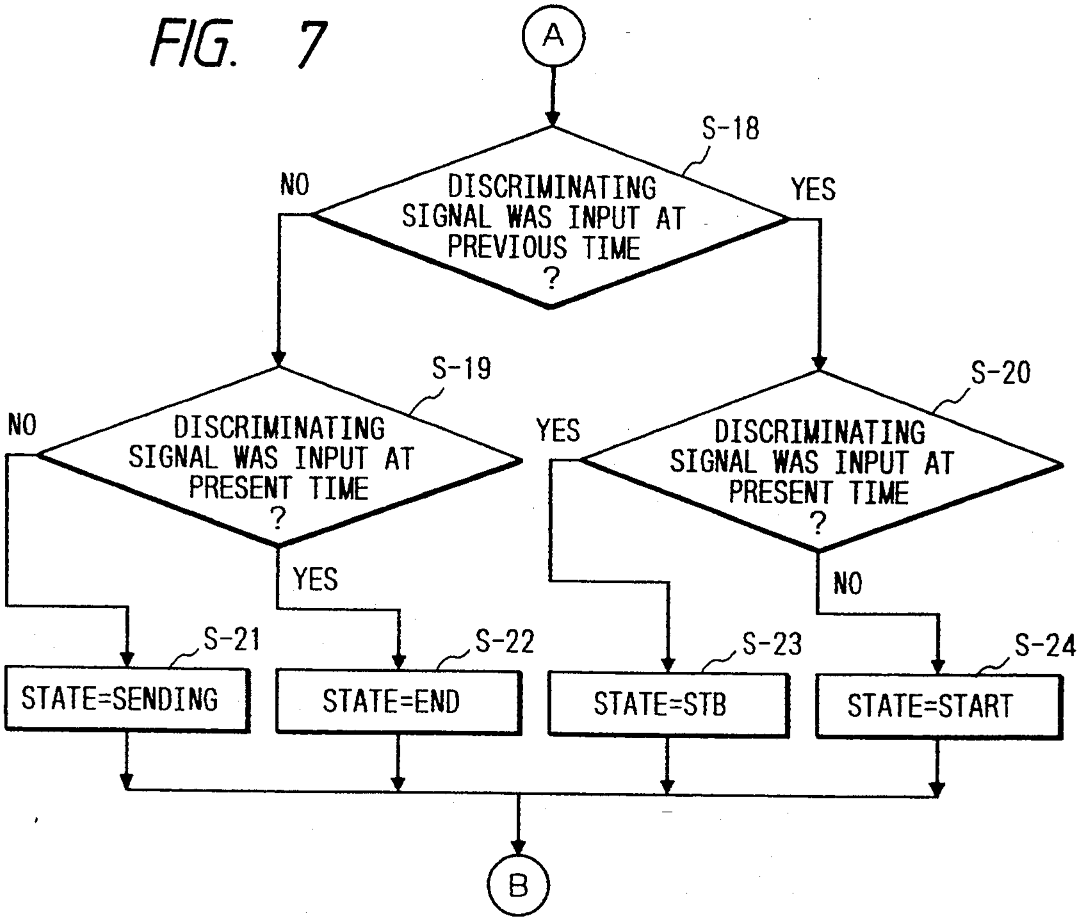
FIG. 7 is a partial flow chart further illustrating the operations to be performed at the signal receiving side in an example of preferred embodiment of the present invention of FIG. 5.
Figure 8:
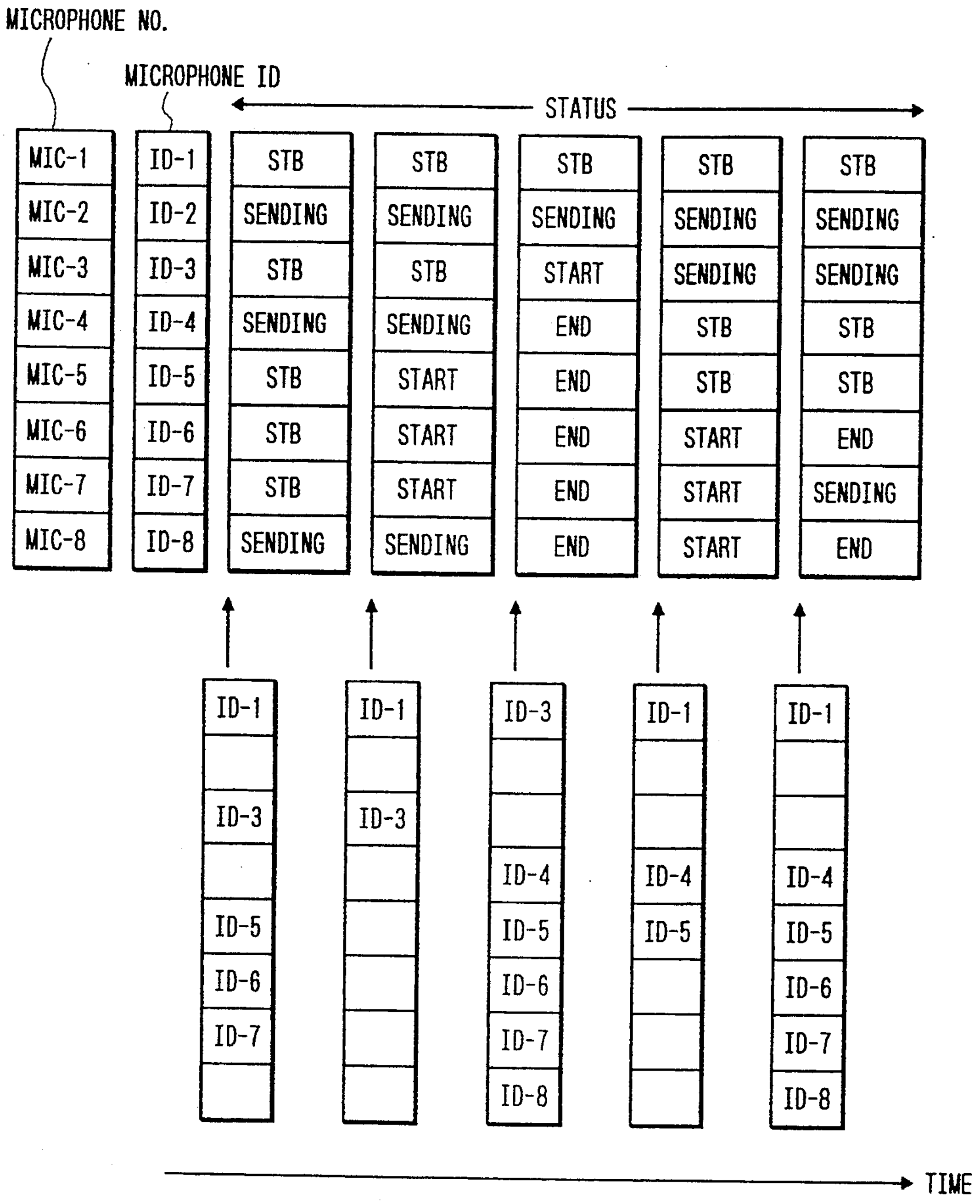
FIG. 8 is a chart illustrating a renewal or updating of the data related to a received discriminating signal (namely, the discriminating signal, the microphone identification (ID) and its status) on the table.

FIGS. 5 to 7 are flow charts illustrating the operation of the signal receiving unit (parent equipment) shown in FIG. 3. FIG. 8 is an explanatory diagram illustrating the renewal of the related data relevant to the received discriminating signal (namely, the discriminating signal, the microphone identification (ID), and its status) on the table.

In FIG. 5, the operation of the apparatus shown in FIG. 3 will be described with reference to FIGS. 5 to 8.

At the signal receiving side, it is determined whether or not any signal has been received from the signal transmitting unit (Step S-10), and, when a signal, which is composed of a mixture of an acoustice signal from the microphone 1 and a discriminating signal read out of the discriminating memory, from each microphone 1 is received by the receiver 9 through the receiving antenna 8 ("Yes" at Step S-10), the second demodulator 10 performs a frequency conversion of this received signal into a signal in the acoustic signal frequency band (Step S-11), and the filter 11 separates the converted signal into an acoustic signal and a discriminating signal (Step S-12).

The discriminating signal thus separated by the filter 11 is demodulated by the first demodulator 12 (Step S-13), and the demodulated discriminating signal is input into the discriminating signal determining apparatus 13 of the reception control unit 15.

The discriminating signal determining apparatus 13 determines, with reference to each entry of the control table, whether or not the demodulated discriminating signal was present in the control table in the control memory 16 also when the particular discriminating signal was received before (Step S-18), and, in the case where the particular discriminating signal was present ("Yes" at Step S-18), the discriminating signal determining apparatus 13 determines whether or not the particular discriminating signal is present at the time of the reception of the same signal at this time (Step S-20), and, in the case where the particular discriminating signal is present ("Yes" at Step S-20), the discriminating signal determining apparatus 13 determines that the status is a stand-by status (STB)(Step S-23) and makes a renewal of the data on the control table.

In the case where it is determined ("No" at Step S-20), namely, in the case where the particular discriminating signal is not present when the discriminating signal is received at this time, the discriminating signal determining apparatus 13 determines (Step S-24) that the status is that for "start," namely, the start of the transmission of an acoustic signal, and renews the data on the control table to the status mentioned above.

On the other hand, in the case where the determination made at Step S-18 is "No," which means that the discriminating signal received was not present when the discriminating signal was received at the previous time, then the discriminating signal determining apparatus 13 determines whether or not the particular discriminating signal is present at the time of the reception of the particular signal at this time (at Step S-19), and, in the case where the particular discriminating signal is present ("Yes" at Step S-19), the discriminating signal determining apparatus 13 determines (Step S-22) that the status is an "end" status and accordingly renews the data on the control table.

Further, in the case where the determination made at Step S-19 is "No," namely, in the case where the particular discriminating signal is not present when the discriminating signal is received at this time, the discriminating signal determining apparatus determines (Step S-21) that the status is that of "sending" which means "in the process of signal transmission" and renews the data on the control table to the status mentioned above.

The determining process described above is performed with respect to each and all of the entries of the control table, and the discriminating signal determining apparatus 13 determines (Step S-14) whether or not the determining process has been performed with respect to all the entries of the control table, and, in the case where it finds that the statuses of all the entries of the control table are in the stand-by status (STB)("Yes" at Step S-15), the recording of acoustic signals is interrupted temporarily (Step S-17).

In the case where any of a "sending" status, an "end" status, and a "start" status is present in the status of any entry of the control table ("No" at Step S-15), the recording of the acoustic signals is started or continued (Step S-16).

Subsequently, this processing operation will be repeated as long as a signal reception is continued.

In other words, the status will be changed to the "start" status when the ID of the microphone number whose status is in the stand-by state (STB) on the control table shown in FIG. 8 is not present among the received discriminating signals, but, when the ID of the microphone number whose status is STB is present among the received discriminating signals, the status will be changed to STB.

Subsequently, the status on the table will be similarly renewed to "start" when the ID of an "end" status is not present, but to "STB" when the ID of an "end" status is present; the status on the table will be renewed to "sending" when the ID of a "sending" status is not present, but to "end" when the ID of a "sending" status is present; and the status on the table will be renewed to "end" when the ID of a "start" status is not present, but to "sending" in case the ID of a "start" status is present.

FIGS. 9(*a*) and 9(*b*) are charts illustrating the transition of the status made by the received discriminating signals, in which FIG. 9(*a*) is a conceptual drawing while FIG. 9(*b*) is a chart showing the correspondence between the pattern of the discriminating signal and the transition status.

As shown in FIG. 9, the status will be changed to "start" in the case where the ID of a signal whose status is "STB" is not present among the received discriminating signals while the status will be changed to "STB" in the case where the ID of "STB" is present among the received discriminating signals.

Subsequently, the status will be changed similarly to "start" in the case where the ID of an "end" status is not present, but to "end" in case the ID of a "sending" status is present, and the status will be changed to "sending" in the case where the ID of "start" is not present while it is changed to "end" in the case where the ID of "start" is present.

The mark "0" in FIG. 9(*a*) expresses the absence of the ID in any of the received discriminating signals, and the mark "1" expresses the presence of the ID in the received discriminating signals.

FIG. 9(*b*) shows the status resulting from a transition in correspondence with the pattern line of the received discriminating signals shown in FIG. 9(*a*). In other words, the status will be "sending" when the pattern line of the received discriminating signals is "00"; the status will be "end" when the pattern line is "01"; the status will be "STB" when the pattern line is "11"; and the status will be "start" when the pattern line is "10".

Figures 9A, 9B, 10:
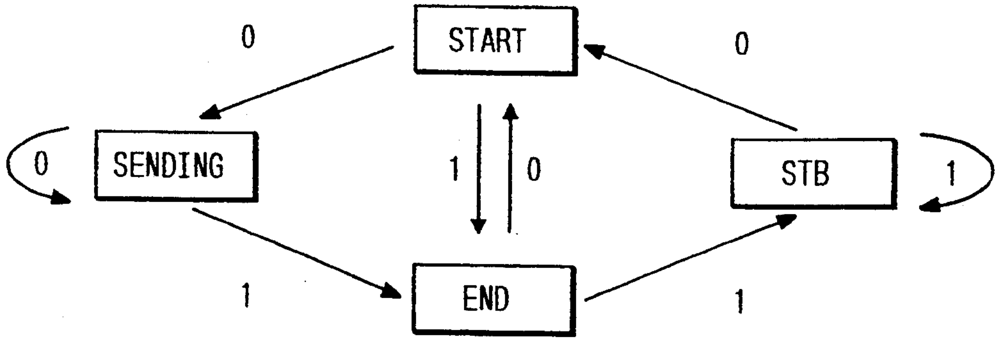
FIG. 10 is a chart illustrating an example of the data structure on the control table.

FIG. 10 is a chart illustrating an example of the data structure on the control table, and the mark "0" expresses the absence of the discriminating signal while the mark "1" expresses the presence of the discriminating signal.

That is to say, the status will be "sending" in the case where the presence or absence of the discriminating signal as determined in respect of the ID-1 at the previous time is "0" and the presence or absence of the discriminating signal as determined this time is "0". In the subsequent operations, the transition of the status takes place as shown in FIG. 10.

As shown above, the discriminating signal determining apparatus 13 records the "received discriminating signals" on the table in the control memory 16 and renews the received discriminating signals at every predetermined timing since it is possible to determine, for example, that an acoustic signal corresponding to a given discriminating signal is being fed when the discriminating signal is not fed at the predetermined timing because the discriminating signal is fed at the predetermined intervals at the signal receiving side when the transmission of an acoustic signal is not being performed.

The discriminating signal determining apparatus 13 compares "the discriminating signals on the renewed discriminating signal control table" with "the discriminating signals on the discriminating signal control table immediately before its renewal" and extracts "the discriminating signals which are eliminated from the renewed discriminating signal control table" and "the discriminating signals which have appeared on the renewed discriminating signal control table".

Then, the discriminating signal determining apparatus 13 records "the discriminating signals which have been eliminated from the renewed discriminating signal control table" with the recording apparatus 17 and also starts the recording of a acoustic signal corresponding to the particular discriminating signal separated by the filter 11.

When the transmission of a discriminating signal is started again upon the completion of the transmission of a acoustic signal, the recording of the acoustic signal is brought to an end.

At this moment, a discriminating signal appears on "the renewed discriminating signal control table", a recording operation is performed by executing a process consisting in "recording this discriminating signal at the end of the acoustic signal recording section".

By this process, the acoustic signal transmitting system according to the present invention is capable of individually recognizing and recording the inputs from a large number of microphones.

As described above, the present invention offers an acoustic signal transmitting system which, being provided with a means of transmitting unique discriminating signals respectively indicating a large number of acoustic signals as installed on the signal transmitting side thereof provided with the large number of acoustic input means, is capable of ascertaining which acoustic input means a given acoustic signal fed to the signal receiving side and recorded there has been supplied from and therefore capable of making it possible to individually discriminating and utilizing the acoustic signals from different sources of acoustic signals, such as different speakers, when the system is used at conferences, meetings, or the like.

What is claimed is:

1. An acoustic signal transmitting system capable of performing signal transmission through a single channel, comprising:

a signal transmitting unit which comprises:

a plurality of acoustic input means each for producing an individual acoustic signal;

a discriminating signal memory for storing a plurality of discriminating signals each corresponding to each of said acoustic input means;

first modulation means for modulating said plurality of discriminating signals into a plurality of signals each with a predetermined acoustic frequency; and transmission control means which transmits at least one of the plurality of acoustic signals when at least one of the plurality of acoustic input means outputs said at least one of the plurality of said acoustic signals and transmits a corresponding one of the plurality of discriminating signals modulated by said first modulating means when said acoustic input means does not output said at least one of the plurality of acoustic signals; and a signal receiving unit which comprises:

filter means for separating said corresponding one of the plurality of discriminating signals and at least one of the plurality of acoustic signals from a transmission signal transmitted from said signal transmitting unit through said single channel;

a management memory means for storing a table for managing the plurality of discriminating signals corresponding to each of the plurality of acoustic input means and data related to the plurality of discriminating signals;

reception control means for comparing said corresponding one of the plurality of discriminating signals separated by said filter with said plurality of discriminating signals stored in said management memory means to determine whether or not a corresponding acoustic signal exists in said management memory means, and for processing said at least one of the plurality of acoustic signals; and means for utilizing said corresponding one of the plurality of discriminating signals and said at least one of the plurality of acoustic signals corresponding to said corresponding one of the plurality of discriminating signals so as to discriminate each of said acoustic input signals.

2. A system as claimed in claim 1, wherein said transmission control means periodically transmits said corresponding one of the plurality of discriminating signals.

3. A system as claimed in claim 1, wherein said management memory means has a table for determining the status of each said plurality of acoustic input means according to said corresponding one of the plurality of discriminating signals transmitted at a previous time and said corresponding one of the plurality of discriminating signals transmitted at a current time.

4. A system as claimed in claim 1, wherein said signal transmission unit further comprises second modulation means for modulating a signal output from said transmission control means into a signal with a transmission frequency.

5. A system as claimed in claim 4, wherein said second modulation means receives said corresponding one of the plurality of discriminating signals modulated by said first modulation means when a signal level of said at least one of the plurality of acoustic signals from said plurality of acoustic input means is lower than a predetermined value, and receives said at least one of the plurality of acoustic signals from said plurality of acoustic input means when the signal level of said at least one of the plurality of acoustic signals from said plurality of acoustic input means is at least equal to said predetermined value.

* * * * *